US012597882B2

(12) United States Patent
Kim

(10) Patent No.: US 12,597,882 B2
(45) Date of Patent: Apr. 7, 2026

(54) PHOTOVOLTAIC POWER GENERATION MODULE USING CONDENSING LENS HAVING MEDIUM THEREIN AND PHOTOVOLTAIC/SOLAR HEAT POWER GENERATION SYSTEM INCLUDING THE SAME

(71) Applicant: Korea Photonics Technology Institute, Gwangju (KR)

(72) Inventor: Hyo Jin Kim, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 15 days.

(21) Appl. No.: 18/738,881

(22) Filed: Jun. 10, 2024

(65) Prior Publication Data

US 2025/0038702 A1     Jan. 30, 2025

(30) Foreign Application Priority Data

Jul. 27, 2023     (KR) ........................ 10-2023-0098365

(51) Int. Cl.
*H02S 20/32*          (2014.01)
*G02F 1/01*           (2006.01)
            (Continued)

(52) U.S. Cl.
CPC ........... *H02S 20/32* (2014.12); *G02F 1/0147* (2013.01); *G02F 1/294* (2021.01); *H02S 40/22* (2014.12)

(58) Field of Classification Search
CPC .............. H02S 20/00–32; H02S 10/30; H02S 40/30–345; H10F 77/40–496
            (Continued)

(56) References Cited

U.S. PATENT DOCUMENTS

2006/0185713 A1*   8/2006   Mook, Jr. ............. H10F 77/488
                                                136/246
2014/0090687 A1*   4/2014   Den Boer ............... C03B 13/08
                                                136/246
2015/0059851 A1*   3/2015   Gerster ................. H10F 77/484
                                                136/259

FOREIGN PATENT DOCUMENTS

CN          2249389 Y   *   3/1997
CN       203963783 U   *   11/2014
            (Continued)

OTHER PUBLICATIONS

CN-2249389-Y English (Year: 1997).*
CN-203963783-U English (Year: 2014).*
JP-2019204082-A English (Year: 2019).*

*Primary Examiner* — Bach T Dinh
(74) *Attorney, Agent, or Firm* — Dinsmore & Shohl LLP; Yongsok Choi, Esq.

(57) ABSTRACT

A photovoltaic power generation module may include a ball lens that receives a medium from the outside or outputs a medium to the outside, receives sunlight that proceeds thereto from the outside when a medium is introduced thereto, and focuses the medium on one focal point, a solar cell that is disposed at a point at which sunlight is focused by the ball lens and produces electric energy from the sunlight, a support part supporting the ball lens and the solar cell and that being rotatable in a preset direction, a first motor that moves the solar cell in a direction in which the solar cell becomes distant from or close to the ball lens, a second motor that rotates the solar cell in a direction θ on a spherical coordinate system, and a third motor that rotates the support part in a direction φ on the spherical coordinate system.

8 Claims, 12 Drawing Sheets

(51) Int. Cl.
    *G02F 1/29*         (2006.01)
    *H02S 40/22*       (2014.01)

(58) Field of Classification Search
    USPC ................................................. 136/243–265
    See application file for complete search history.

(56)                 References Cited

FOREIGN PATENT DOCUMENTS

| | | | |
|---|---|---|---|
| CN | 204965197 U | | 1/2016 |
| JP | 2019204082 A | * | 11/2019 |
| KR | 1020070000657 A | | 1/2007 |
| KR | 101884790 B1 | | 8/2018 |
| KR | 1020210067186 A | | 6/2021 |
| WO | WO-2018187176 A1 | * | 10/2018 ............. H10F 19/80 |

* cited by examiner

100

120

114

118

140

<u>610</u>

<u>710</u>

PHOTOVOLTAIC POWER GENERATION MODULE USING CONDENSING LENS HAVING MEDIUM THEREIN AND PHOTOVOLTAIC/SOLAR HEAT POWER GENERATION SYSTEM INCLUDING THE SAME

CROSS-REFERENCE TO RELATED APPLICATION

The present application claims priority under 35 U.S.C. § 119(a) to Korean Patent Application No. 10-2023-0098365, filed in the Korean Intellectual Property Office on Jul. 27, 2023, the entire disclosure of which is incorporated herein by reference.

This patent is the results of research that was carried out by the support (a unique project number: 1711159488, a detailed project number: 2021M3H4A1A02051253, a project name: Development of epi structure for III-V nanorod solar cells) of the National Research Foundation of Korea by the finances of the government of the Republic of Korea (The Ministry of Science and ICT) in 2024.

This patent is the results of research that was carried out by the support (a unique project number: 1711173064, a detailed project number: 2022M3I8A2085436, a project name: Development of high-efficiency IMM group 3-5 compound semiconductor solar cell for space use) of the National Research Foundation of Korea by the finances of the government of the Republic of Korea (The Ministry of Science and ICT) in 2024.

BACKGROUND

1. Technical Field

The present disclosure relates to a photovoltaic power generation module using a condensing lens having a medium therein and a photovoltaic/solar heat power generation system including the same.

2. Related Art

Contents described in this part merely provide background information of the present embodiment, and do not constitute a conventional technology.

In general, photovoltaic power generation is a technology for converting sunlight into electric energy, and uses a solar cell that generates a photoelectromotive force by using a photoelectric effect. Photovoltaic power generation has advantages in that it uses a clean energy source, has easy maintenance, and can become unmanned.

A solar module continuously produces power by using sunlight and solar heat, and has a problem in that electricity efficiency is reduced because temperatures of a solar cell and a module board in which the solar cell has been installed rise upon power generation.

In order to solve such a problem, a conventional solar module lowers the temperatures of the solar cell and the module board by making a thermal medium flow within a heat absorption pipe that comes into contact with the module board.

In general, a solar module uses a separate condensing apparatus or a sunlight tracking apparatus because the solar module has very low power production efficiency. However, a conventional condensing apparatus or sunlight tracking apparatus has problems in that it has a large or complicated structure and has relatively low condensing or tracking efficiency separately from the large or complicated structure.

SUMMARY

Embodiments of the present disclosure are directed to providing a photovoltaic power generation module capable of improving condensing efficiency of incident sunlight by using a condensing lens having a medium therein and easily tracking sunlight through a simple structure, and a photovoltaic/solar heat power generation system including the same.

According to an aspect of the present disclosure, a photovoltaic power generation module may include a ball lens configured to receive a medium from the outside or output a medium to the outside, receive sunlight that proceeds thereto from the outside when a medium is introduced thereto, and focus the medium on one focal point, a solar cell disposed at a point at which sunlight is focused by the ball lens and configured to produce electric energy from the sunlight, a support part configured to support the ball lens and the solar cell and to be rotatable in a preset direction, a first motor configured to move the solar cell in a direction in which the solar cell becomes distant from or close to the ball lens, a second motor configured to rotate the solar cell in a direction $\theta$ on a spherical coordinate system, and a third motor configured to rotate the support part in a direction $\varphi$ on the spherical coordinate system.

According to an aspect of the present disclosure, the medium is implemented as water.

According to an aspect of the present disclosure, the ball lens includes an intake configured to receive the medium from the outside and an outflux configured to output the medium to the outside.

According to an aspect of the present disclosure, the medium has a refractive index that varies depending on a temperature.

According to an aspect of the present disclosure, the first motor enables the refractive index of the medium to vary depending on the temperature and enables the solar cell to be disposed at the point at which the sunlight is focused by the ball lens.

According to an aspect of the present disclosure, a photovoltaic/solar heat power generation system includes one or more photovoltaic power generation modules, a pipe configured to move a fluid therein, which is heated by sunlight, an arrangement part in which the photovoltaic power generation modules and the pipe are disposed, an inlet and an outlet connected to the pipe disposed within the arrangement part and configured to receive a fluid to be heated from the outside or to output a fluid that has been sufficiently heated within the pipe to the outside, and a control unit configured to control the photovoltaic power generation module to track a direction of the sun and to control a flow of a fluid to be introduced into the inlet or a fluid to be output to the outlet.

According to an aspect of the present disclosure, the solar cell is implemented by using a III-V compound.

According to an aspect of the present disclosure, the solar cell is implemented by using InGaAs, InAsP, InP, GaAs, AlGaAs, InGaP, InGaAsP, AlGaInP, or InGaAsSb.

According to an aspect of the present disclosure, the pipe is implemented by using a material that transmits light that is incident from the outside.

According to an aspect of the present disclosure, a photovoltaic/solar heat power generation system includes the one or more photovoltaic power generation modules, a pipe configured to move a fluid therein, which is heated by sunlight, an arrangement part in which the photovoltaic power generation modules and the pipe are disposed, an inlet and an outlet connected to the pipe disposed within the arrangement part and configured to receive a fluid to be heated from the outside or to output a fluid that has been sufficiently heated within the pipe to the outside, and a control unit configured to control the sunlight tracking and sensing apparatus and the photovoltaic power generation module that track a location on which sunlight is able to be most incident to track the direction of the sun by sensing a change in the orbit of the sun, to control a flow of a fluid to be introduced into the inlet or a fluid to be output to the outlet, and to dispose the photovoltaic power generation module at the location that is tracked by the sunlight tracking and sensing apparatus.

According to an aspect of the present disclosure, photo-voltaic/solar heat power generation system includes the one or more photovoltaic n modules, an arrangement part in which the photovoltaic power generation modules are dis-posed, a second solar cell disposed under the arrangement part and configured to produce electric energy by receiving sunlight, and a control unit configured to control the photovoltaic power generation modules to track the direction of the sun.

According to an aspect of the present disclosure, the second solar cell is implemented by using silicon.

According to an aspect of the present disclosure, the second solar cell is implemented to have an area within a preset error range on the basis of an area of the arrangement part.

According to an aspect of the present disclosure, the arrangement part is implemented by using a material that transmits sunlight.

As described above, an aspect of the present disclosure has advantages in that it can improve condensing efficiency of incident sunlight by using the condensing lens having a medium therein and easily track sunlight through a simple structure.

4

Figure 6A:
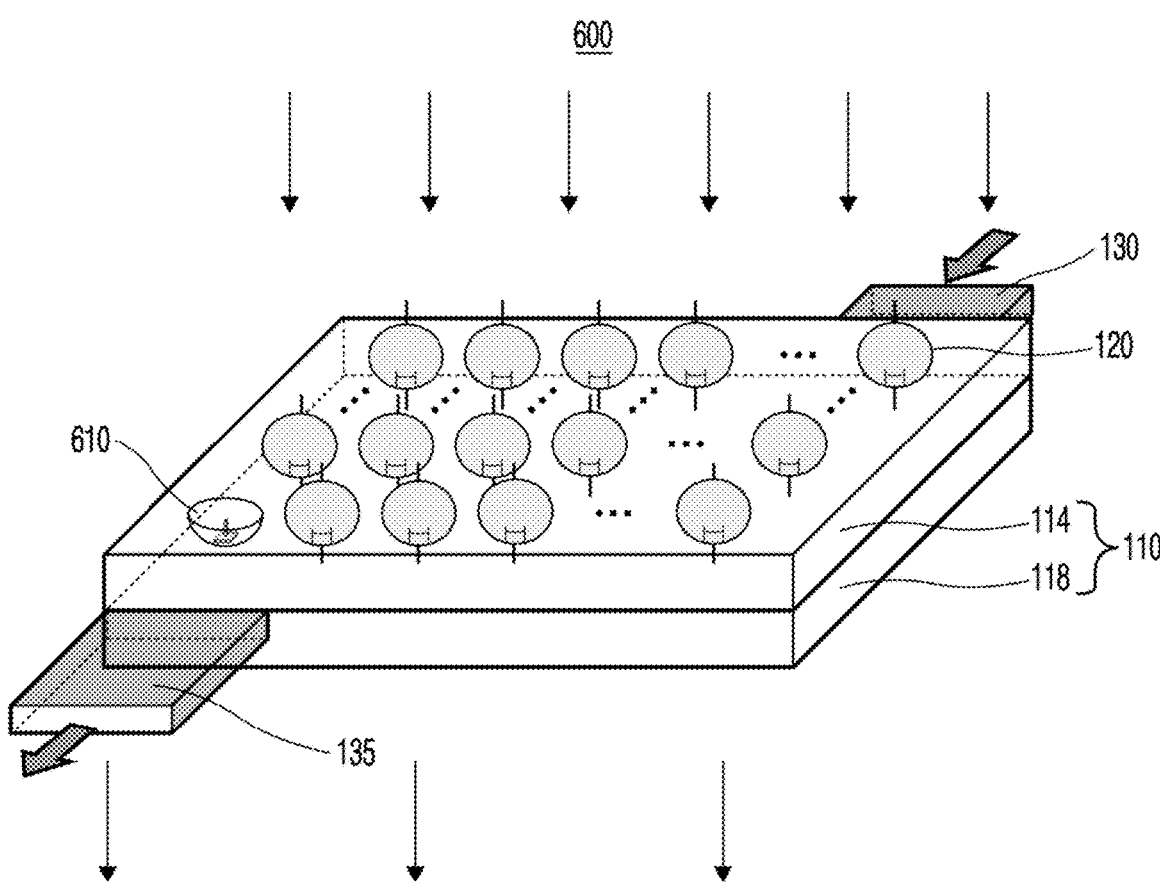
FIG. 6A is a perspective view illustrating a construction of a photovoltaic/solar heat power generation system according to a second embodiment of the present disclosure.
Figure 6B:
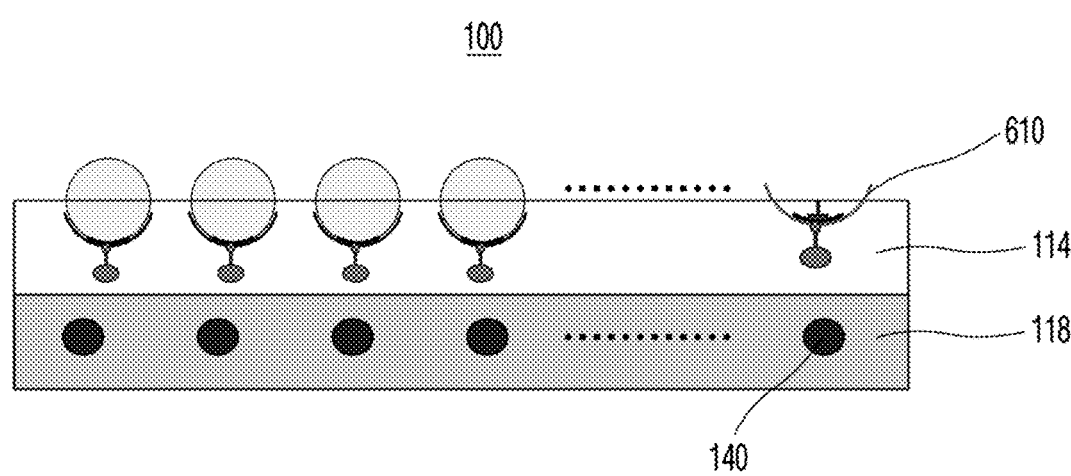

FIG. 6B is a cross-sectional view illustrating the construc-tion of the photovoltaic/solar heat power generation system according to the second embodiment of the present disclo-sure.

Figure 7:
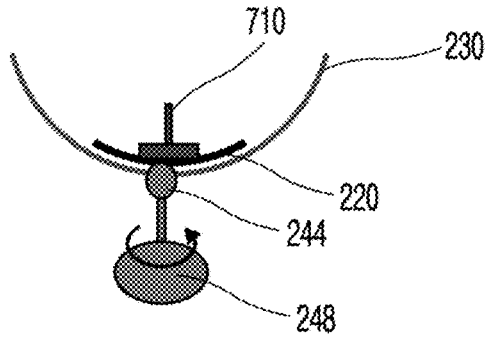

FIG. 7 is a diagram illustrating a construction of a sunlight tracking and sensing apparatus according to an embodiment of the present disclosure.

Figure 8:
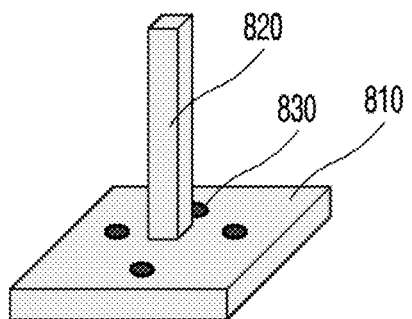

FIG. 8 is a diagram illustrating a construction of a sunlight tracking sensor according to an embodiment of the present disclosure.

Figure 9A:
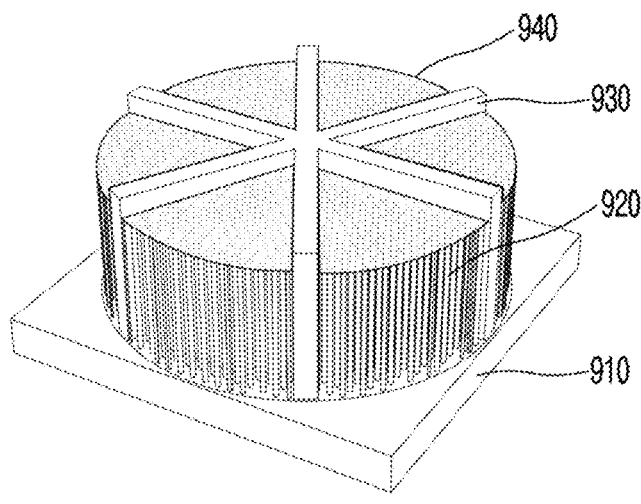
Figure 9B:
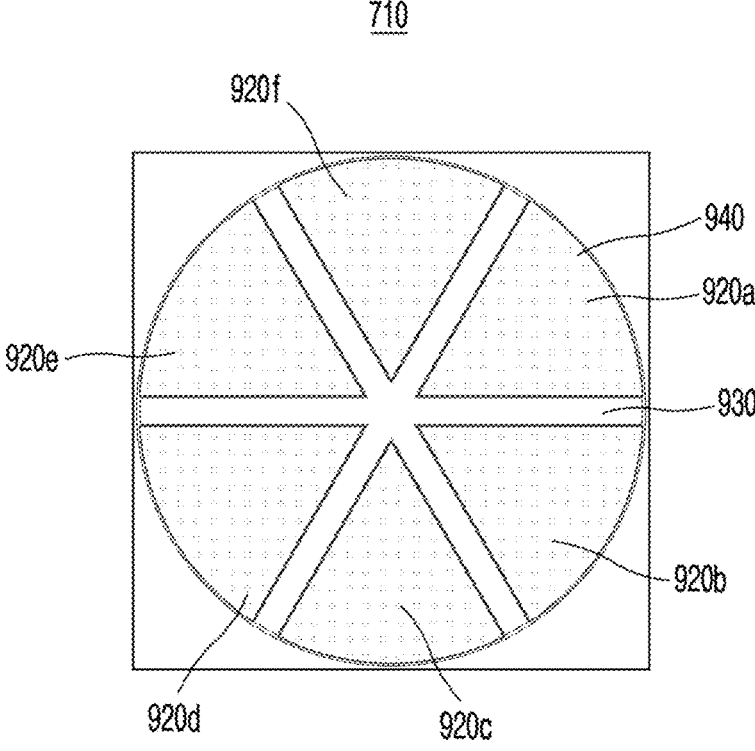

FIGS. 9A and 9B are diagrams illustrating a construction of a sunlight tracking sensor according to another embodi-ment of the present disclosure.

Figure 10:
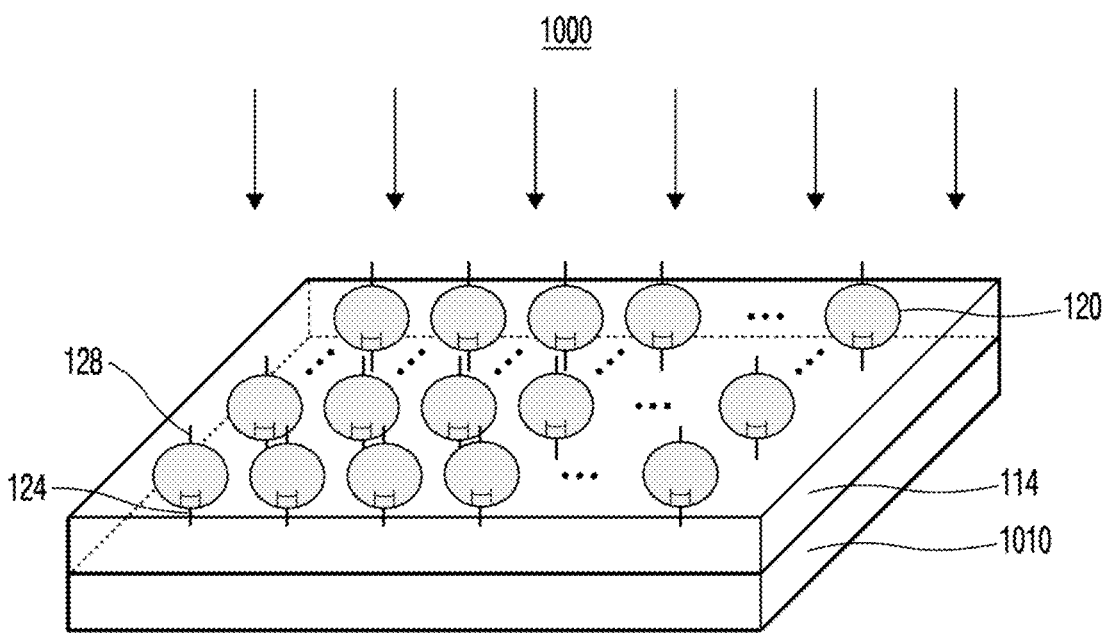

FIG. 10 is a perspective view illustrating a construction of a photovoltaic/solar heat power generation system according to a third embodiment of the present disclosure.

DETAILED DESCRIPTION

The present disclosure may be changed in various ways and may have various embodiments. Specific embodiments are to be illustrated in the drawings and specifically described. It should be understood that the present disclo-sure is not intended to be limited to the specific embodi-ments, but includes all of changes, equivalents and/or sub-stitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be under-stood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or sci-entific terms, have the same meanings as those commonly understood by a person having ordinary knowledge in the art to which the present disclosure pertains, unless defined otherwise in the specification.

Terms, such as those defined in commonly used diction-aries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

Figure 1A:
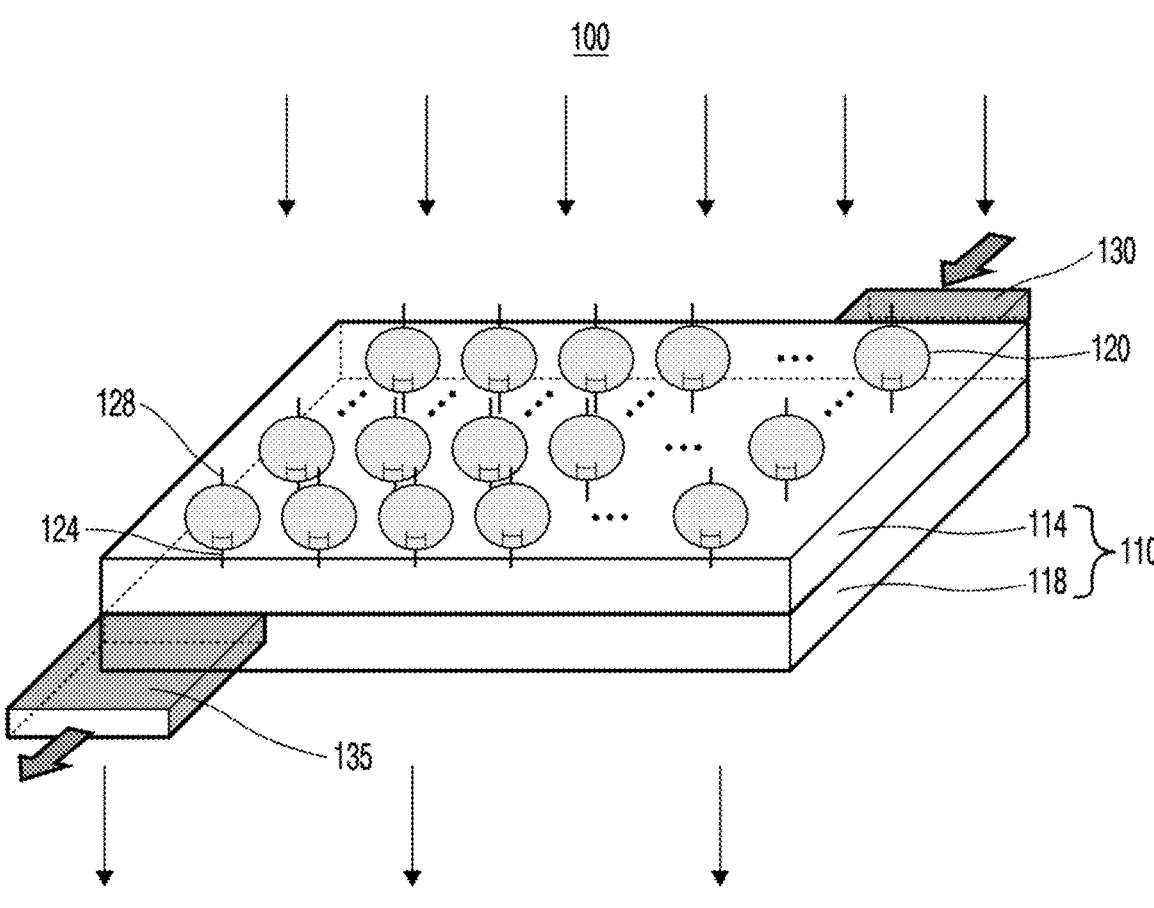
FIG. 1A is a perspective view illustrating a construction of a photovoltaic/solar heat power generation system according to a first embodiment of the present disclosure.
Figure 1B:
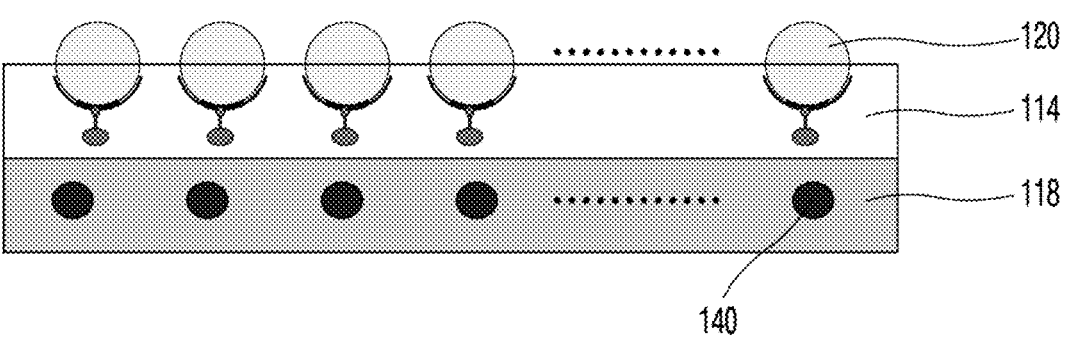
FIG. 1B is a cross-sectional view illustrating a construc-tion of the photovoltaic/solar heat power generation system according to the first embodiment of the present disclosure.

FIG. 1A is a perspective view illustrating a construction of a photovoltaic/solar heat power generation system according to a first embodiment of the present disclosure. FIG. 1B is a cross-sectional view illustrating a construction of the photovoltaic/solar heat power generation system according to the first embodiment of the present disclosure.

Referring to FIGS. 1A and 1B, a photovoltaic/solar heat power generation system 100 according to a first embodiment of the present disclosure includes an arrangement part 110, a photovoltaic power generation module 120 (hereinafter abbreviated as a "module"), an inlet 130, an outlet 135, a pipe 140, and a control unit (not illustrated).

The photovoltaic/solar heat power generation system 100 performs solar heat power generation by which a fluid is heated, simultaneously with: photovoltaic power generation. The photovoltaic/solar heat power generation system 100 may perform photovoltaic power generation for producing electric energy by receiving sunlight. Furthermore, the photovoltaic/solar heat power generation system 100 may perform solar heat power generation by heating a medium that is introduced into the module 120 and a fluid that is introduced into the inlet 130 by using heat that is generated while performing photovoltaic power generation.

The module 120 that performs sunlight/solar heat power generation and the pipe 140 that performs solar heat power generation are disposed in the arrangement part 110. The arrangement part 110 includes a first arrangement part 114 and a second arrangement part 118. The first arrangement part 114 is disposed on a (relatively) upper part of the arrangement part 110, and enables the module 120 to preferentially perform sunlight/solar heat power generation by receiving sunlight. The second arrangement part 118 is disposed on a (relatively) lower part of the arrangement part 110, and enables the pipe 140 to perform solar heat power generation by receiving sunlight that has not been absorbed by the module 120. Each of the arrangement parts 114 and 118 is implemented by using a material that transmits sunlight, and may have a greater height than each of the module 120 and the pipe 140 so that the module 120 and the pipe 140 may be disposed therein.

The module 120 produces electric energy by receiving sunlight. The module 120 includes a solar cell and produces electric energy by using incident light energy. The solar cell may be implemented by using a III-V compound, such as InGaAs, InAsP, InP, GaAs, AlGaAs, InGaP, InGaAsP, AlGaInP, or InGaAsSb, and may be implemented by using a CIGS compound. The module 120 includes a solar cell that is implemented by using the aforementioned component, and produces electric energy from light energy.

The module 120 condenses sunlight that is incident thereon on the solar cell. In this case, the module 120 uses a ball lens 210 (described later with reference to FIG. 2) having a structure in which a medium may be input to and output from the module in condensing the sunlight. In this case, the medium is implemented by using a component having a refractive index and a heat conservation rate having a preset level or more, and is water as a representative example. When the medium is introduced into the ball lens, sunlight that is incident on the module 120 is focused on one focal point (e.g., a solar cell) by the refractive index of the medium. Since the module 120 condenses the sunlight on the solar cell by using the ball lens, the solar cell can secure sufficient electric energy production efficiency, and the medium introduced into the ball lens can be heated by the sunlight. The medium heated up to a temperature having a preset reference value or more as described above is leaked to the outside of the ball lens, and may be used for a separate use.

The module 120 includes a component that moves the location of a solar cell or rotates the solar cell so that the direction of the sun can be tracked. The module 120 moves the solar cell, including the corresponding component, in a direction r or rotates the solar cell in a direction $\theta$ or $\varphi$ on a spherical coordinate system based on the location and elevation of sunlight. Accordingly, the sunlight can be incident on the module 120 as much as possible although the location and elevation of the sun is changed.

The modules 120 are disposed at preset intervals within the first arrangement part 114. If the interval between the modules 120 is increased, sunlight is not incident on the modules 120, and the quantity of sunlight that moves to the second arrangement part 118 is increased. Accordingly, the quantity of heat, which may heat a fluid that is incident on the pipe 140, is increased because the quantity of sunlight incident on the pipe 140 is increased. In contrast, if the interval between the modules 120 is decreased, the quantity of electric energy that is produced is increased because the quantity of sunlight that is incident on the module 120 is more than the quantity of sunlight that passes through the module 120.

The inlet 130 and the outlet 135 are connected to the pipes 140 that are disposed within the second arrangement part 118 so that a fluid to be heated is introduced from the outside or a fluid that has been sufficiently heated within the pipes 140 is discharged to the outside.

The pipes 140 are connected to the inlet 130 and the outlet 135 and are disposed in the second arrangement part 118, and make a fluid flow. The pipe 140 is implemented by using a material that transmits light that is incident thereon from the outside, and it makes a fluid flow and transfers light that is incident thereon to a fluid within the pipe. Furthermore, the pipe 140 may transfer, to a fluid, heat that is generated from the module 120 that operates. Accordingly, the fluid within the pipe 140 can be heated.

The control unit (not illustrated) controls the module 120 so that the module 120 tracks the direction of the sun. The control unit (not illustrated) may determine a movement of the sun according to the time and a date, or may receive information on the location and elevation of the sun from an external sunlight tracking sensor. The control unit (not illustrated) controls a solar cell within the module 120 so that sunlight is incident on the solar cell as much as possible while the solar cell moves along the sun, based on the determined information or the received information. Accordingly, the module 120 can produce electric energy with maximum efficiency always when the sun is out, regardless of the location and elevation of the sun.

The control unit (not illustrated) controls the input and output of a medium to and from the ball lens within the module 120 by controlling the module 120. The control unit (not illustrated) controls the medium so that the medium is introduced into the ball lens or the medium within the ball lens is leaked. The control unit (not illustrated) determines whether a temperature of a medium to be introduced into the ball lens is a preset reference value or less, in introducing the medium into the ball lens. When the temperature of the medium to be introduced into the ball lens is the preset reference value or less, the control unit (not illustrated) controls the medium so that the medium is introduced into the ball lens. When the temperature of the medium to be introduced into the ball lens is not the preset reference value or less, the control unit (not illustrated) returns the medium to the outside (e.g., a storage tank). Accordingly, the control unit (not illustrated) controls a medium having a temperature of a preset reference value or less to be heated by sunlight that is incident on the ball lens. The control unit (not illustrated) determines whether a temperature of a medium that has been previously introduced into the ball lens or a medium that has been discharged by the ball lens is a preset reference value or more, in order to improve efficiency of solar heat power generation (the heating of a medium). When a temperature of a medium within the ball lens is greater than a preset reference value, the control unit (not illustrated) controls the medium so that the medium is discharged to the outside of the ball lens. In contrast, when the temperature of the medium discharged by the ball lens is the preset reference value or less, the control unit (not illustrated) makes the medium discharged by the ball lens incident on the ball lens again. The medium that has been heated to the preset reference value or more by the control unit (not illustrated) may be stored in a component, such as a storage tank (not illustrated), or may be directly discharged to a separate component that will use the medium for other purposes. In this case, the preset reference value may be adjusted depending on the use of the medium to be discharged to the outside. For example, if a medium is water and a medium to be discharged will be used as hot water within a building, the preset reference value may be implemented as about 60° C.

The control unit (not illustrated) controls a flow of a fluid to be introduced into the inlet 130 or to be discharged to the outlet 135. The control unit (not illustrated) determines whether a fluid that flows within the pipe 140 has a preset temperature by sensing a temperature of the fluid. If the temperature of the fluid has reached the preset temperature, it may be more efficient to discharge the fluid, receive a new fluid, and heat the new fluid, rather than heating the fluid having the temperature that has reached the preset temperature. When the temperature of the fluid within the pipe 140 is higher than the preset temperature, the control unit (not illustrated) discharges the fluid that now flows within the pipe 140 to the outlet 135, and newly receives a fluid through the inlet 130.

As described above, the modules 120 are disposed at preset intervals. Accordingly, there is sunlight that passes through the module 120 without being incident on the module 120. The sunlight that passes through the module 120 is incident on the second arrangement part 118 via the first arrangement part 114, and is incident on a fluid within the pipe 140. Since a wavelength band for heating a fluid is limited to infrared rays, only light having an infrared wavelength band, among pieces of light incident on the pipe 140, is absorbed by the fluid, and light having the remaining wavelength bands passes through the pipe 140. Accordingly, the photovoltaic/solar heat power generation system 100 may be installed in a building like a BIPV system, and may also be installed in a space (e.g., a space for growing plants) on which light, in particular, light having a visible light wavelength band needs to be incident.

Figure 2:
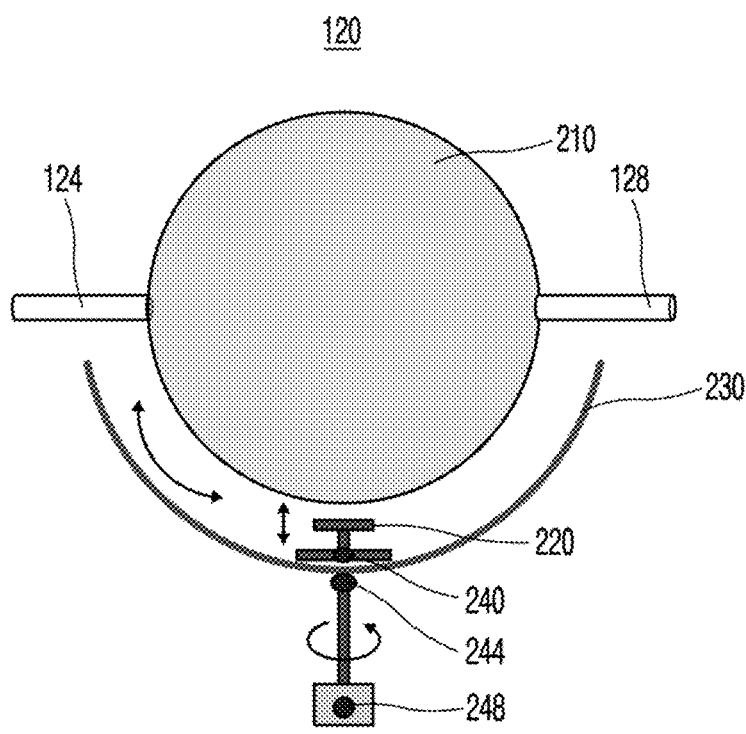
FIG. 2 is a diagram illustrating a construction of a photovoltaic power generation module according to an embodiment of the present disclosure.

FIG. 2 is a diagram illustrating a construction of a photovoltaic power generation module according to an embodiment of the present disclosure.

Referring to FIG. 2, the module 120 according to an embodiment of the present disclosure includes the ball lens 210, a solar cell 220, a support part 230, a first motor 240, a second motor 244, and a third motor 248.

The ball lens 210 includes an intake 124 and an outflux 128, and receives and outputs a medium. The ball lens 210 includes the intake 124 and the outflux 128 each implemented by using a material that transmits sunlight. Under the control of the control unit (not illustrated), the intake 124 receives a medium within the ball lens 210 through the intake 124 from the outside (e.g., a storage tank), and the outflux 128 discharges a medium within to the outside of the ball lens 210 (e.g., the storage tank).

Each of the intake 124 and the ball lens 210 includes a temperature sensor (not illustrated) for sensing a temperature of a medium. The temperature sensor (not illustrated) senses a temperature of a medium that is introduced into the intake 124 or a temperature of a medium that is present within the ball lens 210. The temperature sensor (not illustrated) senses the temperature and transmits the sensed temperature to the control unit (not illustrated). The control unit (not illustrated) controls whether to input a medium to the ball lens 210 and to discharge a medium to the outside of the ball lens 210 by receiving a sensing value of each temperature sensor (not illustrated).

Alternatively, the temperature sensor (not illustrated) may be disposed in each of the intake 124 and the outflux 128. The temperature sensor (not illustrated) disposed in the intake 124 performs the same operation as that described above. The temperature sensor (not illustrated) disposed in the outflux 128 senses a temperature of a medium that is discharged. The control unit (not illustrated) receives a sensing value from the temperature sensor (not illustrated) disposed in the outflux 128, makes a medium that is discharged to the outside of the ball lens 210 proceed to the intake 124 again when a temperature of the medium is a preset reference value or less, and discharges the medium to the outside of the ball lens 210 when the temperature of the medium is not the preset reference value or less.

When a medium is introduced into the ball lens 210, the ball lens 210 receives sunlight that proceeds thereto from the outside, and focuses the sunlight on one focal point (a valid focal distance) according to the refractive index of the medium. A path along which the ball lens 210 focuses sunlight that proceeds thereto from the outside is illustrated in FIGS. 3A, 3B, and 3C.

Figure 3A:
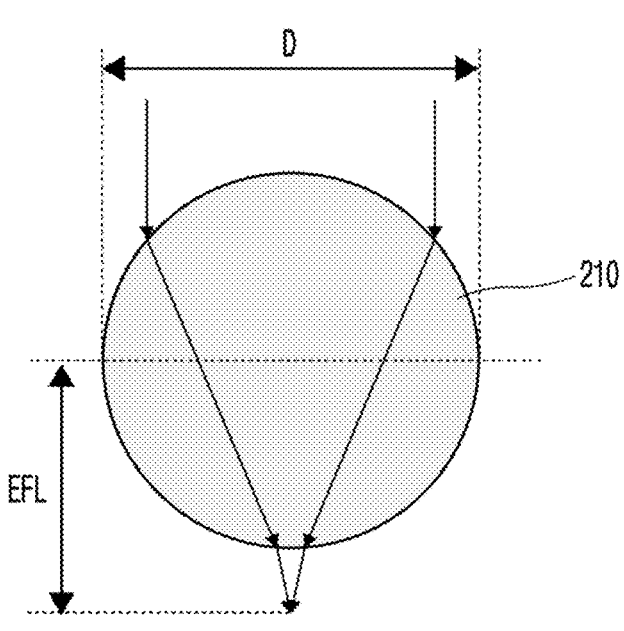
FIGS. 3A, 3B, and 3C are diagrams illustrating a structure of a ball lens and the path of light that is incident on the ball lens according to an embodiment of the present disclosure.
Figure 3B:
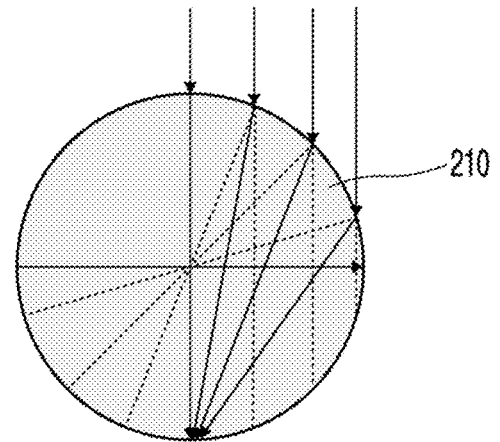
Figure 3C:
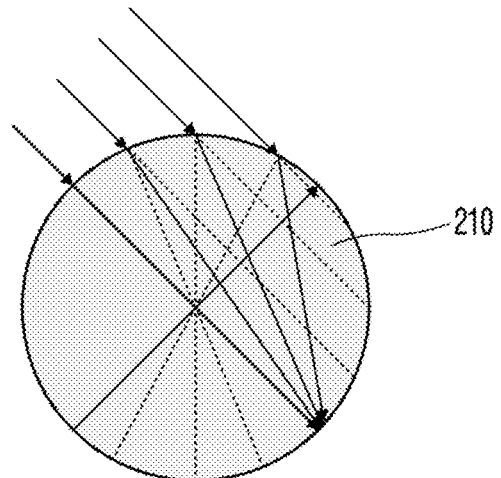

FIGS. 3A to 3C are diagrams illustrating the structure of the ball lens and the path of light that is incident on the ball lens according to an embodiment of the present disclosure.

Referring to FIGS. 3A to 3C, if the ball lens 210 has the following conditions of an equation below, light that is incident on the ball lens 210 may be focused on the bottom of the ball lens 210.

$$EFL = \frac{nD}{4(n-1)}$$

In the above equation, EFL means a valid focal distance. n means the refractive index of a medium that is introduced into the ball lens 210. D means the diameter of a ball lens 210. Light that is incident on the ball lens 210 is influenced by the refractive index of a medium and the diameter of the ball lens 210, and is focused at a constant valid focal distance. That is, if the refractive index n of the medium or the diameter D of the ball lens 210 is adjusted, the valid focal distance of light that is incident on the ball lens 210 may be adjusted based on the adjusted refractive index or diameter.

In particular, when the refractive index of a medium is 2, the valid focal distance of light that is incident on the ball lens 210 is half the diameter of the ball lens 210. That is, if the refractive index of the medium is implemented as 2, the light that is incident on the ball lens 210 may be focused on a surface of the ball lens 210. A location at which the solar cell 220 will be disposed may be adjusted by adjusting the valid focal distance of light by adjusting the diameter of the ball lens 210 or the refractive index of a medium as described above.

Referring back to FIG. 2, the solar cell 220 is disposed at a point at which light is focused by the ball lens 210, and produces electric energy from sunlight. As described above, the solar cell 220 is implemented as a III-V compound or a CIGS compound. The solar cell 220 is supported by the support part 230, and the location of the solar cell 220 may be adjusted or rotated by the motors 240, 244, and 248.

The support part 230 supports the ball lens 210 and the solar cell 220, and is rotated in the direction φ by the third motor 248. The support part 230 has a concave shape so that the ball lens 210 can be seated and supported. As the support part 230 has the concave shape, the support part 230 supports the ball lens 210, and may also support the solar cell 220 that is implemented in a curved shape between the support part 230 and the ball lens 210.

The support part 230 may have a frictional force having a preset intensity or more. Accordingly, the support part 230 supports the ball lens 210 and the solar cell 220, and is also rotated along with the ball lens 210 and the solar cell 220 supported by the support part 230 when the support part 230 is rotated by the third motor 248.

The first motor 240 adjusts an interval between the solar cell 220 and the ball lens 210 by adjusting the location of the solar cell 220. The first motor 240 moves the solar cell 220 in a direction in which the solar cell 220 becomes distant from the ball lens 210 or in a direction (i.e., the direction r) in which the solar cell 220 becomes close to the ball lens 210. This is caused by a change in the refractive index according to a temperature of a medium, which is illustrated in FIGS. 4A, 4B, and 4C.

Figure 4A:
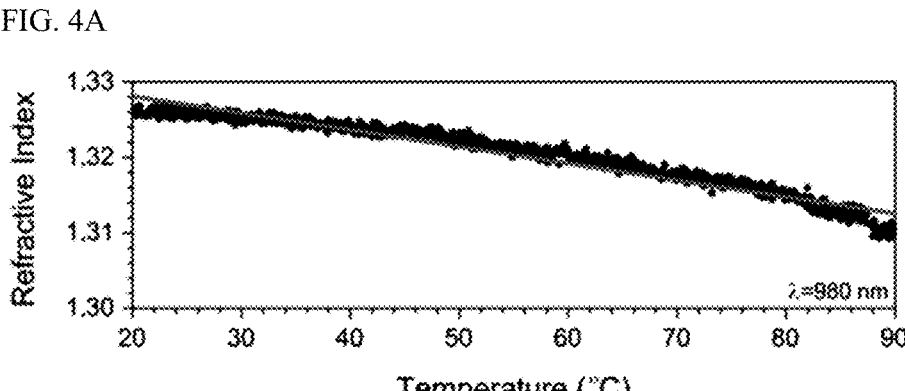
FIGS. 4A, 4B, and 4C are graphs illustrating a change in the refractive index according to a temperature of water that is introduced into the ball lens according to the present embodiment.
Figure 4B:
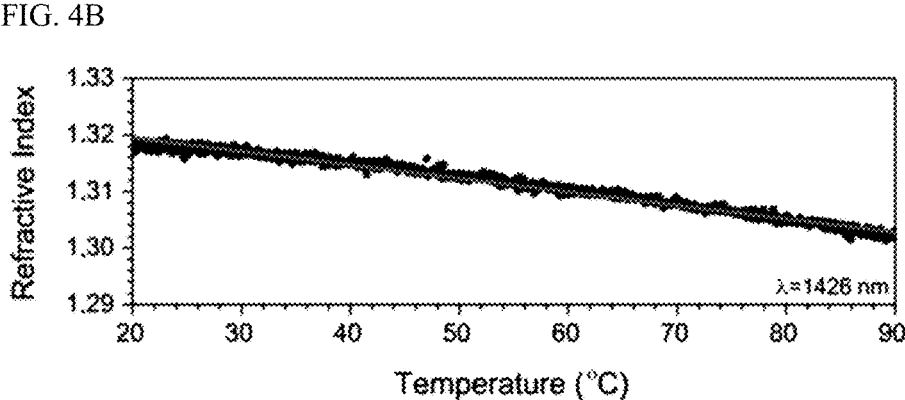
Figure 4C:
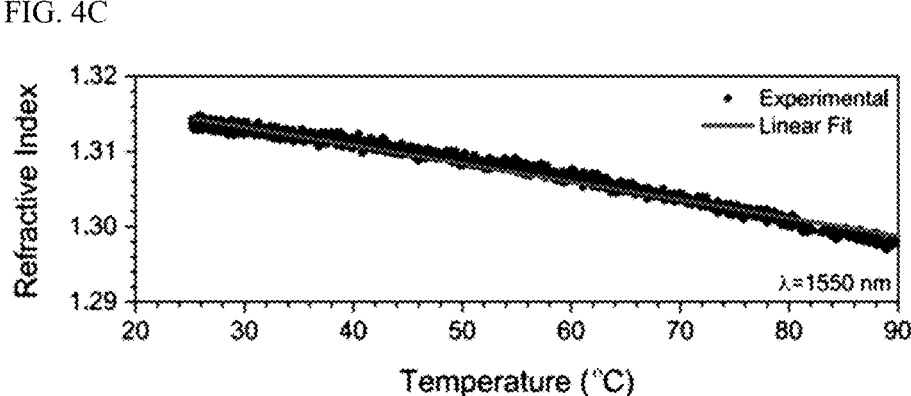

FIGS. 4A, 4B, and 4C are graphs illustrating a change in the refractive index according to a temperature of water that is introduced into the ball lens according to the present embodiment.

Referring to FIGS. 4A to 4C, it may be seen that the refractive index of a medium is changed due to a change in the temperature of the medium although reference is made to any one of graphs illustrated in FIGS. 4A to 4C.

Referring back to FIG. 2, a change in the refractive index causes a change in the valid focal distance according to the above equation. If the valid focal distance is changed as described above, the solar cell may have optimal electric energy production efficiency only when the location of the solar cell 220 is changed based on the changed valid focal distance. In order to respond to a change in the refractive index of a medium according to a temperature of the medium and a change in the valid focal distance as described above, the first motor 240 adjusts an interval between the solar cell 220 and the ball lens 210 by adjusting the location of the solar cell 220. Accordingly, although the valid focal distance is changed by the ball lens 210, the solar cell 220 can secure optimal electric energy production efficiency.

The second motor 244 and the third motor 248 rotate the solar cell 220 and the support part 230, respectively. The second motor 244 rotates the solar cell 220 in the direction θ, and the third motor 248 rotates the support part 230 in the direction φ. The second motor 244 and the third motor 248 rotate the solar cell 220 and the support part 230 in their directions at constant angles, respectively, under the control of the control unit (not illustrated) so that the solar cell 220 is disposed at a location at which the solar cell receives sunlight as much as possible. Alternatively, the second motor 244 and the third motor 248 may perform operations opposite to the aforementioned operations.

Figure 5A:
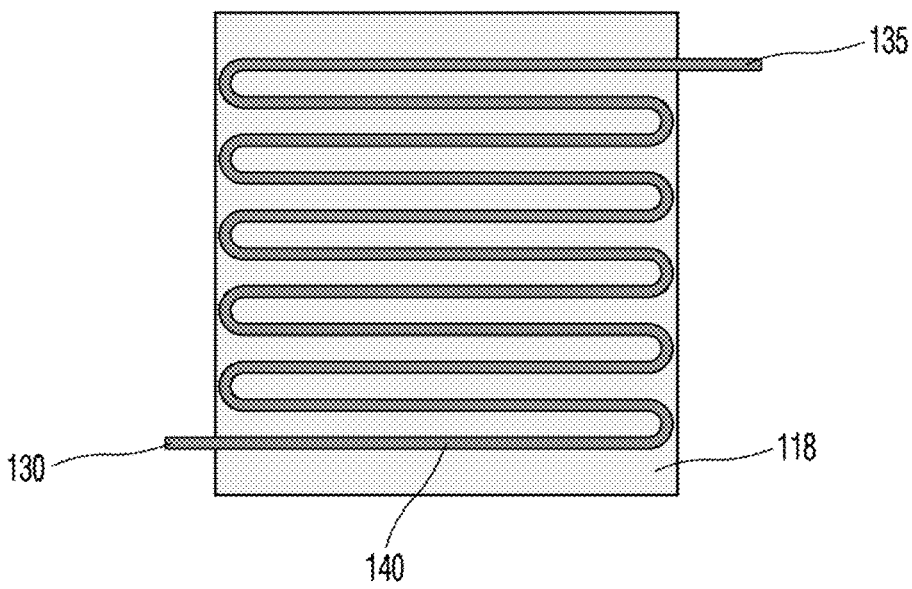
FIGS. 5A and 5B are diagrams illustrating a pipe that is disposed within a second arrangement part according to an embodiment of the present disclosure.
Figure 5B:
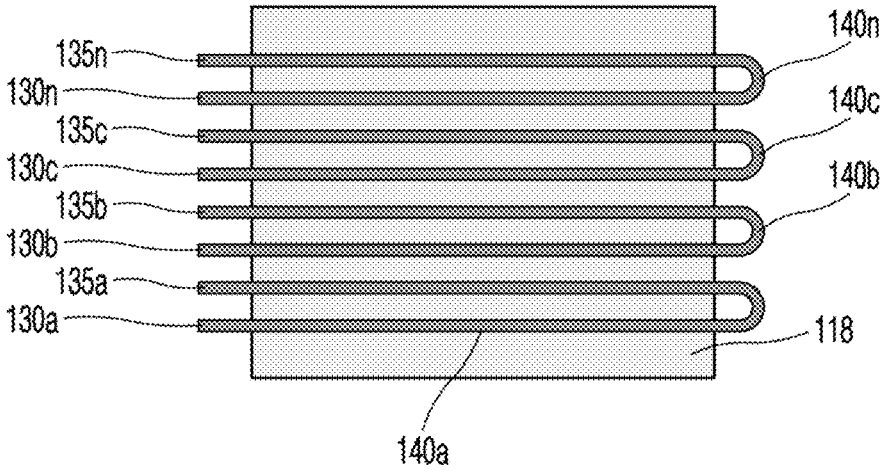

FIGS. 5A and 5B are diagrams illustrating the pipe that is disposed within the second arrangement part according to an embodiment of the present disclosure.

Referring to FIG. 5A, one pipe 140 may be disposed within the second arrangement part 118, may be bent in an "S" shape, and may be disposed to have a maximum thermal surface area within the second arrangement part 118. One inlet 130 and one outlet 135 may be formed in the pipe 140. The pipe 140 may be disposed in the S shape, and may connect the inlet 130 and the outlet 135. Under the control of the control unit (not illustrated), a fluid is introduced into the inlet 130, heated through the pipe, and discharged to the outlet 135 when the fluid has a preset temperature.

Referring to FIG. 5B, a plurality of inlets 130a, 130b, 130c, and 130n and a plurality of outlets 135a, 135b, 135c, and 135n may be formed in the second arrangement part 118. Each of the pipes 140a, 140b, 140c, and 140n may connect any one inlet and an outlet that is closest to the any one inlet. If such a structure is implemented as described above, control of the control unit (not illustrated) and the structures of the inlet 130, outlet 135, and pipe 140 that will be disposed may become relatively complicated, but a fluid can be heated more efficiently because fluids can be discharged to different outlets depending on a temperature of a fluid within each of the pipes 140a, 140b, 140c, and 140n. The control unit (not illustrated) may analyze whether a temperature of a fluid within each of the pipes 140a, 140b, 140c, and 140n is higher than a preset temperature by checking the temperature of the fluid, and may control the input of the fluid to each of the inlets 130a, 130b, 130c, and 130n and the output of the fluid from each of the outlets 135a, 135b, 135c, and 135n.

FIG. 6A is a perspective view illustrating a construction of a photovoltaic/solar heat power generation system according to a second embodiment of the present disclosure. FIG. 6B is a cross-sectional view illustrating the construction of the photovoltaic/solar heat power generation system according to the second embodiment of the present disclosure.

Referring to FIGS. 6A and 6B, a photovoltaic/solar heat power generation system 600 according to the second embodiment of the present disclosure further includes a sunlight tracking and sensing apparatus 610 in the components of the photovoltaic/solar heat power generation system 100.

The sunlight tracking and sensing apparatus 610 is an apparatus that tracks a location at which the photovoltaic/solar heat power generation system may receive the most sunlight, that is, a location that is vertically downward from the sun by sensing a change in the orbit of the sun. The sunlight tracking and sensing apparatus 610 senses and analyzes the quantity of incident sunlight so that the solar cell is moved along a location at which the quantity of the incident sunlight is a maximum (i.e., a location at which the sunlight is focused by the ball lens). The sunlight tracking and sensing apparatus 610 is disposed at one location within the first arrangement part 114. The sunlight tracking and sensing apparatus 610 analyzes the location and elevation of the sun by receiving sunlight under the same conditions as those of the module 120. The sunlight tracking and sensing apparatus 610 transfers a sensing value to the control unit (not illustrated) so that the control unit (not illustrated) controls the modules 120 in order to dispose the solar cells 220 within the modules 120 at corresponding locations, respectively.

The control unit (not illustrated) analyzes a location at which the quantity of incident sunlight within the module 120 (i.e., a location at which the sunlight is focused by the ball lens) is a maximum by receiving a sensing value from the sunlight tracking and sensing apparatus 610 so that the solar cell 220 is disposed at the corresponding location.

The structure of the sunlight tracking and sensing apparatus 610 is illustrated in FIG. 7.

FIG. 7 is a diagram illustrating a construction of the sunlight tracking and sensing apparatus according to an embodiment of the present disclosure.

Referring to FIG. 7, the sunlight tracking and sensing apparatus 610 according to an embodiment of the present disclosure includes a support part 230, a second motor 244, a third motor 248, and a sunlight tracking sensor 710. The sunlight tracking and sensing apparatus 610 may further include a solar cell 220.

Each of the support part 230, the second motor 244, and the third motor 248 performs the same operation as those of the module 120.

The sunlight tracking sensor 710 senses the location (i.e., the direction) and elevation of sunlight by receiving the sunlight that is incident thereon. The sunlight tracking sensor 710 needs to receive sunlight that has not undergone the ball lens 210 in order to sense the location and elevation of the sunlight. Accordingly, the sunlight tracking sensor 710 is disposed under the same conditions as those of the solar cell 220 within the module 120 except the ball lens 210. The sunlight tracking sensor 710 senses the location (i.e., the direction) and elevation of sunlight from the sunlight that is incident thereon in a corresponding environment.

The sunlight tracking and sensing apparatus 610 may further include the solar cell 220. The solar cell 220 may be disposed at the bottom (i.e., between the sunlight tracking sensor and the support part) of the sunlight tracking sensor 710, and may produce electric energy by using sunlight that is incident thereon. The sunlight tracking and sensing apparatus 610 may also additionally produce electric energy along with sensing by further including the solar cell 220.

FIG. 8 is a diagram illustrating a construction of a sunlight tracking sensor according to an embodiment of the present disclosure.

Referring to FIG. 8, the sunlight tracking sensor 710 according to an embodiment of the present disclosure includes a board 810, a rod 820, and a plurality of optical sensors 830.

The rod 820 and the optical sensors 830 are disposed in the board 810. The board 810 transfers the sensing values of the optical sensors 830 to the outside (the control unit).

The rod 820 protrudes vertically upward from the board 810 at a preset height, and produces a shadow by receiving sunlight that is incident thereon. The shadow that is formed by the rod 820 is different depending on the location (i.e., the direction) or elevation of the sun.

Each of the optical sensors 830 senses the intensity of sunlight that is incident thereon. The plurality of optical sensors 830 is disposed at preset intervals or preset angles on the board 810. The optical sensors 830 are disposed as described above and each sense the intensity of sunlight. When the sun is disposed at a location that is vertically upward from the sunlight tracking sensor 710 (i.e., a location at which the most sunlight is incident), a shadow that is formed by the rod 820 is formed only at the bottom of the rod 820 without being disposed at any optical sensor 830. Accordingly, a sensing value that is generated by each optical sensor 830 becomes a maximum. In contrast, when the sun falls outside from the aforementioned location in terms of the location or elevation, the length or direction of a shadow that is formed by the rod 820 is different, and a sensing value that is generated by each optical sensor 830 is gradually reduced.

The control unit (not illustrated) calculates the sum of sensing values of the optical sensors 830 by receiving the sensing values that are generated by the optical sensors 830, respectively, by using the aforementioned characteristic. If the sensing value of each optical sensor 830 is not a maximum, the control unit (not illustrated) controls each motor 244 or 248 so that the solar cell 220 or the support part 230 is moved in the direction in which a sensing value generated by each optical sensor 830 is a maximum. As described above, the sunlight tracking and sensing apparatus 610 is disposed under the same conditions as those of the modules 120. The most sunlight is incident on the sunlight tracking and sensing apparatus 610 when a sensing value generated by each optical sensor 830 is a maximum. Accordingly, the control unit (not illustrated) moves the solar cell 220 or the support part 230 in the direction in which the sensing value of each optical sensor 830 within the sunlight tracking sensor 710 is a maximum so that the most sunlight is incident on the solar cell 220.

FIGS. 9A and 9B are diagrams illustrating a construction of a sunlight tracking sensor according to another embodiment of the present disclosure.

Referring to FIGS. 9A and 9B, the sunlight tracking sensor 710 according to another embodiment of the present disclosure includes a first electrode board 910, a nano rod 920, a barrier rib 930, and a second electrode 940.

The first electrode board 910 provides a space in which the remaining components of the sunlight tracking sensor 710 may be disposed. The first electrode board 910 receives electric energy produced by the nano rod 920, and transfers the electric energy to the control unit (not illustrated) or a component (not illustrated) capable of storing the electric energy. The nano rod 920 and the barrier rib 930 may be disposed at the top of the first electrode board 910. Furthermore, the first electrode board 910 is electrically connected to the nano rod 920 along with the second electrode 940. The first electrode board 910 receives electric energy that is produced by the nano rod 920 by receiving sunlight that is incident thereon, and transfers the electric energy to the control unit (not illustrated) or an energy storage part (not illustrated). The first electrode board may be implemented by using a Group 3 material, for example, InP.

The nano rod 920 has a preset size and is implemented by using a preset component. The nano rod 920 produces electric energy by receiving sunlight that is incident thereon. The nano rod 920 is implemented in a cylindrical or prismatic shape having a unit size (or diameter) of several nm to several tens of μm, and is disposed in the first electrode board 910 in plural number. The nano rod 920 may be implemented by using a III-V compound, such as InGaAs, InAsP, InP, GaAs, AlGaAs, InGaP, InGaAsP, AlGaInP, or InGaAsSb, and may also be implemented by using silicon or a CIGS compound. The nano rod 920 is implemented by using the aforementioned component, and produces electric energy by using sunlight that is incident thereon.

The barrier rib 930 is formed between nano rod parts of the nano rod 920, and it forms a shadow and separates the region of the nano rod 920 into a plurality of nano rod parts. The barrier rib 930 is disposed toward the end of the first electrode board 910 on the basis of the center of the first electrode board 910 or the nano rod 920. At least two barrier ribs 930 are disposed, and separate the region of the nano rod 920 into the plurality of nano rod parts. As illustrated in FIG. 9B, if six nano rod parts 920a to 920f are disposed on the first electrode board 910 toward the ends of the six nano rod parts, respectively, on the basis of the center of the first electrode board 910, the barrier rib 930 separates the region of the nano rod 920 into the six nano rod parts. As the number of barrier ribs 930 that are disposed is increased, the number of nano rod parts that are separated is increased, and the accuracy of sunlight tracking is also improved. The barrier rib 930 is formed at the same height as the nano rod or at a higher height than the nano rod, and forms a shadow depending on the direction of the sun. The quantity of sunlight that is incident on a nano rod part at each location and the quantity of electric energy that is produced accordingly are different because the barrier rib 930 forms a shadow depending on the direction of the sun. The control unit (not illustrated) may analyze the direction of sunlight by using such a principle.

The barrier rib 930 is a component that does not transmit light, and may be implemented by using any component if the component may be grown on the first electrode board 910. As a representative example, the barrier rib 930 may be implemented by using dielectric (SiN$_x$) or metal (e.g., titanium or gold). The barrier rib 930 is implemented by using various components, and may be grown, deposited, or plated on the first electrode board 910.

The second electrode 940 is disposed on each of the nano rod parts 920a to 920f, and it receives electric energy that is produced by the nano rod or each of the nano rod parts and transfers the electric energy to the control unit (not illustrated) or a component (not illustrated) capable of storing the electric energy. The second electrode 940 may also be implemented by using the same component as the first electrode board 910 or another component capable of transferring electric energy. The second electrode 940 is disposed in the same shape as a cross section (i.e., a shape when the nano rod part is viewed at a vertically upward location) of the nano rod part that is separated by the barrier rib 930, and is electrically connected to a corresponding nano rod part of the nano rod 920. The second electrode 940 transfers electric energy that is produced by the nano rod 920 to the aforementioned component.

The second electrode 940 may be implemented as a transparent electrode so that the nano rods 920 disposed thereunder can produce electric energy by receiving light.

The control unit (not illustrated) analyzes the direction and elevation of the sun on the basis of the sunlight tracking sensor 710, based on the quantity of electric energy that is produced by each of the nano rod parts 920a to 920f. The control unit (not illustrated) compares the quantities of electric energy that is produced by the nano rod parts 920a to 920f. If the sun is disposed vertically upward on the basis of the sunlight tracking sensor 710, a phenomenon in which a shadow formed by the barrier rib 930 is disposed at a specific nano rod part is minimized, and sunlight is incident on most of all of the nano rod parts. Accordingly, almost the same electric energy may be produced by the nano rod parts. In contrast, assuming that the sun is out at an angle of 45° (to the ground) at about ten o'clock on the basis of FIG. 9A, the nano rod part 920e that is disposed closest to the sun or the nano rod part 920d or 920f that is disposed a location at which the sun can be viewed without undergoing the barrier rib 930 produces a relatively large quantity of electric energy. In contrast, the quantity of electric energy that is produced by each of the nano rod parts 920a to 920c disposed at locations that are distant from the sun is relatively small because a shadow formed by the barrier rib 930 is disposed in the nano rod parts 920a to 920c. Since the quantity of electric energy produced by each of the nano rod parts 920a to 920f is different depending on the location of the sun due to the barrier rib 930 as described above, the control unit (not illustrated) may analyze where the sun is disposed on the basis of the sunlight tracking sensor 710, based on the quantity of electric energy that is produced by each of the nano rod parts 920a to 920f. The control unit (not illustrated) may check that the sun is out in the direction in which a nano rod part that produces a relatively large quantity of electric energy is disposed, and may check the meridian altitude of the sun based on a relative difference between the quantities of electric energy that is produced by the nano rod parts 920a to 920f. Furthermore, the control unit (not illustrated) may track the sun by moving a sunlight panel (not illustrated) or a sunlight tracking and sensing apparatus (not illustrated) in a direction (i.e., the sun is disposed vertically upward) in which the quantities of electric energy produced by the nano rod parts 920a to 920f becomes uniform.

FIG. 10 is a perspective view illustrating a construction of a photovoltaic/solar heat power generation system according to a third embodiment of the present disclosure.

Referring to FIG. 10, a photovoltaic/solar heat power generation system 1000 according to a third embodiment of the present disclosure includes a second solar cell 1010, instead of the second arrangement part 118 and the pipe 140 disposed within the second arrangement part 118, among the components of the photovoltaic/solar heat power generation system 100 or the photovoltaic/solar heat power generation system 600.

The second solar cell 1010 is disposed under the first arrangement part 114, and produces electric energy by receiving sunlight that passes through the first arrangement part 114. The second solar cell 1010 may be implemented by using a silicon material. The second solar cell 1010 has relatively lower electric energy production efficiency than the solar cell 220, but may be implemented to be relatively cheaper than the solar cell 220. Accordingly, the second solar cell 1010 is implemented to have an area that is the same as or similar (a preset error range) to the area of the first arrangement part 114 under the first arrangement part 114, and may produce electric energy by receiving light that passes through the first arrangement part 114 without being introduced into the module 120.

The above description is merely a description of the technical spirit of the present embodiment, and those skilled in the art may change and modify the present embodiment in various ways without from departing the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

15

16

What is claimed is:

1. A photovoltaic/solar heat power generation system comprising:

one or more photovoltaic power generation modules;

a first arrangement part made of material that transmits sunlight and disposed on a upper part of an arrangement part such that the one or more photovoltaic power generation modules receive the sunlight first;

a second arrangement part made of material that transmits sunlight and disposed on a lower part of the arrangement part to receive a rest of the sunlight not absorbed by the one or more photovoltaic power generation modules;

a pipe disposed within the second arrangement part and configured to move a fluid therein, which is heated by sunlight;

the arrangement part in which the photovoltaic power generation modules and the pipe are disposed;

an inlet and an outlet connected to the pipe disposed within the arrangement part and configured to receive a fluid to be heated from an outside or to output a fluid that has been sufficiently heated within the pipe to the outside; and a control unit configured to control the photovoltaic power generation module to track a direction of a sun and to control a flow of a fluid to be introduced into the inlet or a fluid to be output to the outlet, wherein each of the one or more photovoltaic power generation module includes:

a ball lens configured to receive a medium from an outside or output a medium to the outside, receive sunlight that proceeds thereto from the outside when a medium is introduced thereto, and focus the medium on one focal point;

a solar cell disposed at a point at which sunlight is focused by the ball lens and configured to produce electric energy from the sunlight;

a support part configured to support the ball lens and the solar cell and to be rotatable in a preset direction;

a first motor configured to move the solar cell in a direction in which the solar cell becomes distant from or close to the ball lens;

a second motor configured to rotate the solar cell in a direction θ on a spherical coordinate system; and a third motor configured to rotate the support part in a direction φ on the spherical coordinate system.

2. The photovoltaic/solar heat power generation system of claim 1, wherein the solar cell is implemented by using a III-V compound.

3. The photovoltaic/solar heat power generation system of claim 1, wherein the solar cell is implemented by using InGaAs, InAsP, InP, GaAs, AlGaAs, InGaP, InGaAsP, AlGaInP, or InGaAsSb.

4. The photovoltaic/solar heat power generation system of claim 1, wherein the pipe is implemented by using a material that transmits light that is incident from the outside.

5. The photovoltaic/solar heat power generation system of claim 1, further comprising a sunlight tracking and sensing apparatus configured to track a location on which sunlight is able to be most incident by sensing a change in an orbit of the sun.

6. A photovoltaic/solar heat power generation system comprising:

one or more photovoltaic power generation modules;

an arrangement part in which the photovoltaic power generation modules are disposed;

a second solar cell having a same area as the arrangement part and disposed under the arrangement part and configured to produce electric energy by receiving sunlight that passes through the arrangement part without being incident on the one or more photovoltaic power generation modules; and a control unit configured to control the photovoltaic power generation modules to track a direction of a sun, wherein each of the one or more photovoltaic power generation module includes:

a ball lens configured to receive a medium from an outside or output a medium to the outside, receive sunlight that proceeds thereto from the outside when a medium is introduced thereto, and focus the medium on one focal point;

a solar cell disposed at a point at which sunlight is focused by the ball lens and configured to produce electric energy from the sunlight;

a support part configured to support the ball lens and the solar cell and to be rotatable in a preset direction;

a first motor configured to move the solar cell in a direction in which the solar cell becomes distant from or close to the ball lens;

a second motor configured to rotate the solar cell in a direction θ on a spherical coordinate system; and a third motor configured to rotate the support part in a direction φ on the spherical coordinate system.

7. The photovoltaic/solar heat power generation system of claim 6, wherein the second solar cell is implemented by using silicon.

8. The photovoltaic/solar heat power generation system of claim 6, wherein the arrangement part is implemented by using a material that transmits sunlight.

\* \* \* \* \*